United States Patent
Kawakami

(10) Patent No.: US 7,262,884 B2
(45) Date of Patent: Aug. 28, 2007

(54) IMAGE PROCESSING APPARATUS AND IMAGE PROCESSING METHOD

(75) Inventor: Haruko Kawakami, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1033 days.

(21) Appl. No.: 10/301,797

(22) Filed: Nov. 22, 2002

(65) Prior Publication Data

US 2004/0252343 A1    Dec. 16, 2004

(51) Int. Cl.
*G06K 15/00* (2006.01)
*H04N 1/40* (2006.01)

(52) U.S. Cl. .................. 358/2.1; 358/1.9; 358/462; 358/463; 358/464; 358/465; 358/466; 358/457; 358/453; 358/426; 382/245; 382/246; 382/173; 382/174; 382/175; 382/176; 382/254; 382/255

(58) Field of Classification Search ............... 358/1.9, 358/2.1, 462–466, 453, 426.13; 382/245–246, 382/173–176, 254–255
See application file for complete search history.

(56) References Cited

U.S. PATENT DOCUMENTS 6,035,059 A * 3/2000 Kurosawa et al. .......... 382/164
6,411,741 B1 * 6/2002 Hamamura et al. ......... 382/254
6,424,742 B2    7/2002 Yamamoto et al.
6,631,210 B1 * 10/2003 Mutoh et al. ............... 382/176

FOREIGN PATENT DOCUMENTS

| JP | 4-5305 B2 | 1/1992 |
| JP | 5-46749 B2 | 7/1993 |
| JP | 5-50187 B2 | 7/1993 |
| JP | 5-56067 B2 | 8/1993 |
| JP | 6-5879 B2 | 1/1994 |
| JP | 2558928 B2 | 9/1996 |
| JP | 11-55505 A | 2/1999 |
| JP | 11055505 A * | 2/1999 |

* cited by examiner

*Primary Examiner*—Twyler Lamb
*Assistant Examiner*—Quang N. Vo
(74) *Attorney, Agent, or Firm*—Foley & Lardner LLP

(57) ABSTRACT

A white background determination section performs a white background determination on the basis of a white threshold calculated by a white threshold calculation section and an area size selected by an area size determination section. A character discrimination section executes character recognition such that a condition for character discrimination is relaxed when the white background determination section determines that a pixel of interest belongs to a white background, and the condition for character discrimination is made stricter in other cases.

2 Claims, 3 Drawing Sheets

PIXEL DETERMINED TO BE WHITE

NON-WHITE PIXEL

IMAGE PROCESSING APPARATUS AND IMAGE PROCESSING METHOD

BACKGROUND OF THE INVENTION

The present invention relates to an image processing apparatus and an image processing method, wherein an image process for an input color image is performed, for example, in a digital color copying machine that reads a color image on an original and forms a copy image thereof.

In the field of modern copying machines, it is common art to perform, in an initial set mode, a discrimination process for an original on which a character image and a gray-scale image appear in a mixed fashion, and to apply a suitable image process for each image and output the processed result.

Jpn. Pat. Appln. KOKOKU Publication No. 04-5305, for instance, discloses a discrimination method wherein a two-dimensional block of a predetermined size is generated, a pixel value of a pixel of interest is compared with a pixel value of a peripheral pixel, the presence of an edge is determined when a difference between the pixel values is greater than a predetermined value, and the edge is detected as a component of a character or a ruled line.

However, an edge portion of a gray-scale image, which does not belong to a screen dot area, may be erroneously recognized as a character. As a result, the image quality of the erroneously recognized portion may deteriorate.

BRIEF SUMMARY OF THE INVENTION

The object of the present invention is to provide an image processing apparatus and an image processing method, which can enhance precision in image area discrimination with respect to a mixed image comprising a line/character, screen dots/photo, etc.

In order to achieve the object, the present invention may provide an image processing apparatus comprising: a calculation section that calculates a value used to determine an attribute of an area on the basis of an image signal; an area size determination section that determines an area size on the basis of a predetermined condition; and an area attribute determination section that determines an attribute of a pixel of interest in the image signal, on the basis of the area size determined by the area size determination section and the value that is calculated by the calculation section and is used to determine the attribute of the area.

The invention may also provide an image processing method comprising: calculating a value used to determine an attribute of an area on the basis of an image signal; determining an area size on the basis of a predetermined condition; and determining an attribute of a pixel of interest in the image signal, on the basis of the determined area size and the calculated value used to determine the attribute of the area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
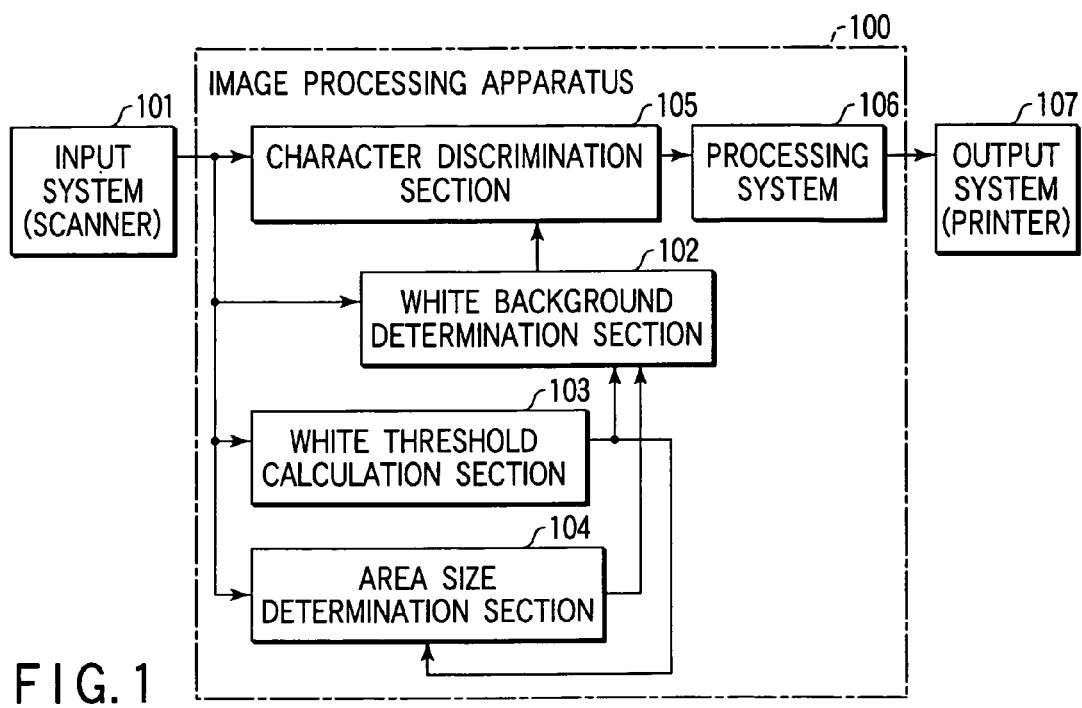
FIG. 1 is a block diagram schematically showing the structure of an image forming apparatus according to the present invention.

FIG. 1 schematically shows the structure of an image forming apparatus according to the present invention. The image forming apparatus comprises an input system 101 such as a scanner, an image processing apparatus 100, and an output system 107 such as a printer.

The image processing apparatus 100 according to a first embodiment of the invention comprises a white-background determination section 102, a white threshold calculation section 103, an area size determination section 104, a character discrimination section 105 and a processing system 106 functioning as an image processing section.

An image signal d0 is supplied from the input system 101 to the image processing apparatus 100. The image signal d0 represents an optical signal from the scanner system, such as a single-color luminance signal, a red signal, a green signal, or a blue signal. The optical signal represents white (or a high-light portion) when its value is "1", and black (or a shadow portion) when its value is "0". Signal values indicative of one or more light components are supplied as the image signal d0.

The image signal d0 is input to the white-background determination section 102, white threshold calculation section 103, area size determination section 104 and character discrimination section 105.

Assume that a plurality of image signals d0, i.e. color signals, are supplied from the input system 101. In this case, the white-background determination section 102, white threshold calculation section 103 and area size determination section 104 process only a value corresponding to a black-and-white luminance signal. Thus, an average value of RGB signals is first obtained. In the case of color signals, "R" indicates a red signal, "G2 indicates a green signal and "B" indicates a blue signal.

The white threshold calculation section 103 finds a maximum value Dmax and a minimum value Dmin within an area of an original. Then, based on a preset white threshold ratio Rw, a white threshold Dw is obtained by the following equation:

$$Dw = Dmin + (Dmax - Dmin) \times Rw.$$

However, in the case where an original is a print on colored paper, noise may excessively be picked up when a white background is determined. Thus, the following process is added. That is, when the value Dw obtained by the above equation is smaller than a predetermined threshold Dwth, the value Dwth is used as a white threshold.

The area size determination section 104 counts the run-length of white pixels in the vicinity of a pixel of interest.

Figure 2:
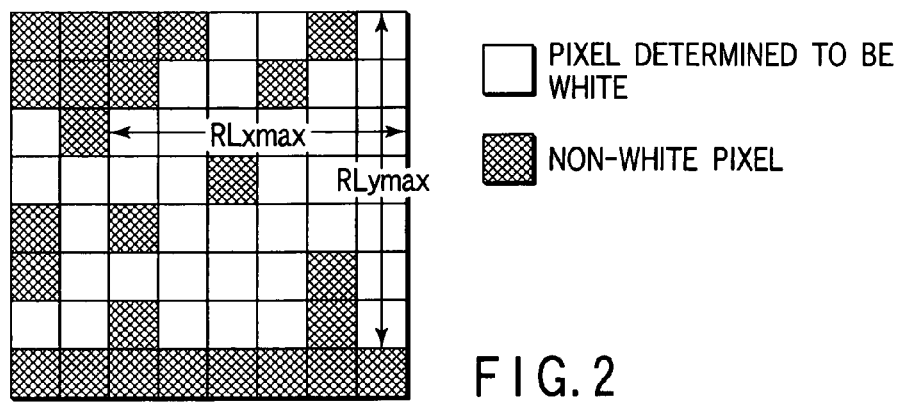
FIG. 2 is a view for explaining a white pixel run-length coefficient.

FIG. 2 is a schematic view for determining a maximum run-length within an area of interest. The white pixel run-length is a count value of successive pixels with brightness values greater than the white threshold (Dw, or Dwth) in the area.

In FIG. 2, a maximum run-length in a main scan direction is RLxmax, and a maximum run-length in a sub-scan direction is RLymax.

In this case, in order that even a narrow area, such as an area between patches, can be determined as a white background, the shorter one of the maximum run-length in the main scan direction and the maximum run-length in the sub-scan direction is chosen as the maximum run-length in the area. In this embodiment, the maximum run-length RLxmax in the main scan direction is chosen as the maximum run-length in this area.

The obtained maximum run-length RLmax associated with the pixel of interest is used in selecting the size of an operator used for white background determination. For example, if sizes of reference areas are A1, A2 and A3, the obtained maximum run-length associated with the pixel of interest is used in selecting the size of an operator used for white background determination.

Specifically, the area size determination section 104 compares the maximum run-length of the pixel of interest with preset thresholds th1 and th2 (A1<th1<A2<th2<A3). In the case where the maximum run-length RLmax is RLmax<th1, the area size determination section 104 selects the area size A1 as the area size. Where the maximum run-length RLmax is th1≦RLmax<th2, the area size determination section 104 selects the area size A2 as the area size. Where the maximum run-length RLmax is RLmax>th2, the area size determination section 104 selects the area size A3 as the area size.

The size of the area for finding the white pixel maximum run-length in the vicinity of the pixel of interest is set at a value that is, at least, greater than the threshold th1.

The maximum operator A3 needs to have, at least, a size covering an 18-point character used as a thick logogram.

A determination method performed in the white background determination section 102 will now be described.

In principle, the white background determination section (area attribute determination section) 102 determines that a pixel, which has a value greater than the white threshold (Dw or Dwth) obtained by the white threshold calculation section 103 in the area of interest, is a white pixel. The white background determination section 102 compares the ratio of occupation of this white pixel with a predetermined threshold thr1. The white background determination section 102 determines that a pixel of interest, which has the ratio greater than the threshold thr1, is a pixel in the white background area.

In this case, however, if the pixel of interest is located in a screen dot area with a small number of lines of meshes and a low ratio of screen dots, this pixel may erroneously be determined as "pixel in the white background area." In order to prevent a pixel that is possibly a screen dot from being erroneously determined, the threshold (thr1) of the ratio of occupation of white pixels is set at a high value.

Figure 3:
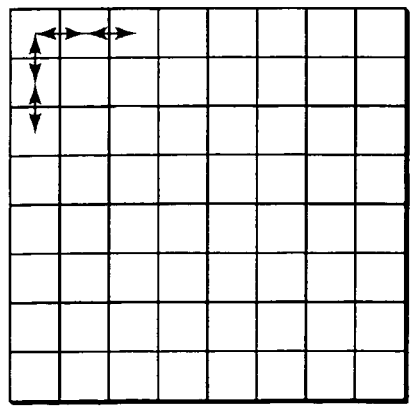
FIG. 3 is a view for explaining a screen dot area detection.

Specifically, the white background determination section 102 finds a difference value in the main scan direction and a difference value in the sub-scan direction, as shown in FIG. 3, in an area of the same size as the operator used for the white pixel determination, and also finds a sum or an average thereof.

The white background determination section 102 compares the threshold thd with the sum or average of the difference value in the main scan direction and the sum or average of the difference value in the sub-scan direction, respectively. When the values in both the main scan direction and sub-scan direction are greater than the threshold thd, the white background determination section 102 determines that the pixel of interest is possibly within the screen dot area. In this case, the white background determination section 102 changes the white occupation ratio threshold used for the white background determination from the threshold thr1 to a higher threshold thr2.

The white background determination section 102 delivers to the character discrimination section 105 a determination result as to whether the pixel of interest belongs to the white background.

If it is determined that the pixel of interest belongs to the white background, the character discrimination section 105 relaxes the condition for character determination. As regards other pixels, the character discrimination section 105 makes the condition stricter.

The character discrimination section 105 executes character discrimination and then supplies the image signal to the processing system 106.

The processing system 106 subjects the supplied image signal to various image processes, and delivers the processed result to the output system 107.

As has been described above, according to the first embodiment, it is possible to determine whether a pixel of interest belongs to a white background or not, regardless of the reflectance of paper used as an original.

In addition, the size of the operator is switched according to the run-length of peripheral white pixels. Thus, even where a pixel of interest is located in a narrow white background area between patches or a character is a large logogram of 18 points or more, it can be detected as a white background.

Furthermore, the sum or average of the difference between adjacent pixels in the operator is compared with a predetermined threshold. If it is greater than the threshold, the white pixel occupation ratio threshold is altered to a higher threshold. This reduces the possibility that a screen dot area with a low screen dot ratio is erroneously determined to be a white background.

A second embodiment of the invention will now be described.

In the first embodiment, the size of the operator is switched in the white background determination section. In the second embodiment, a plurality of operators with different sizes are used to execute white background determination.

Figure 4:
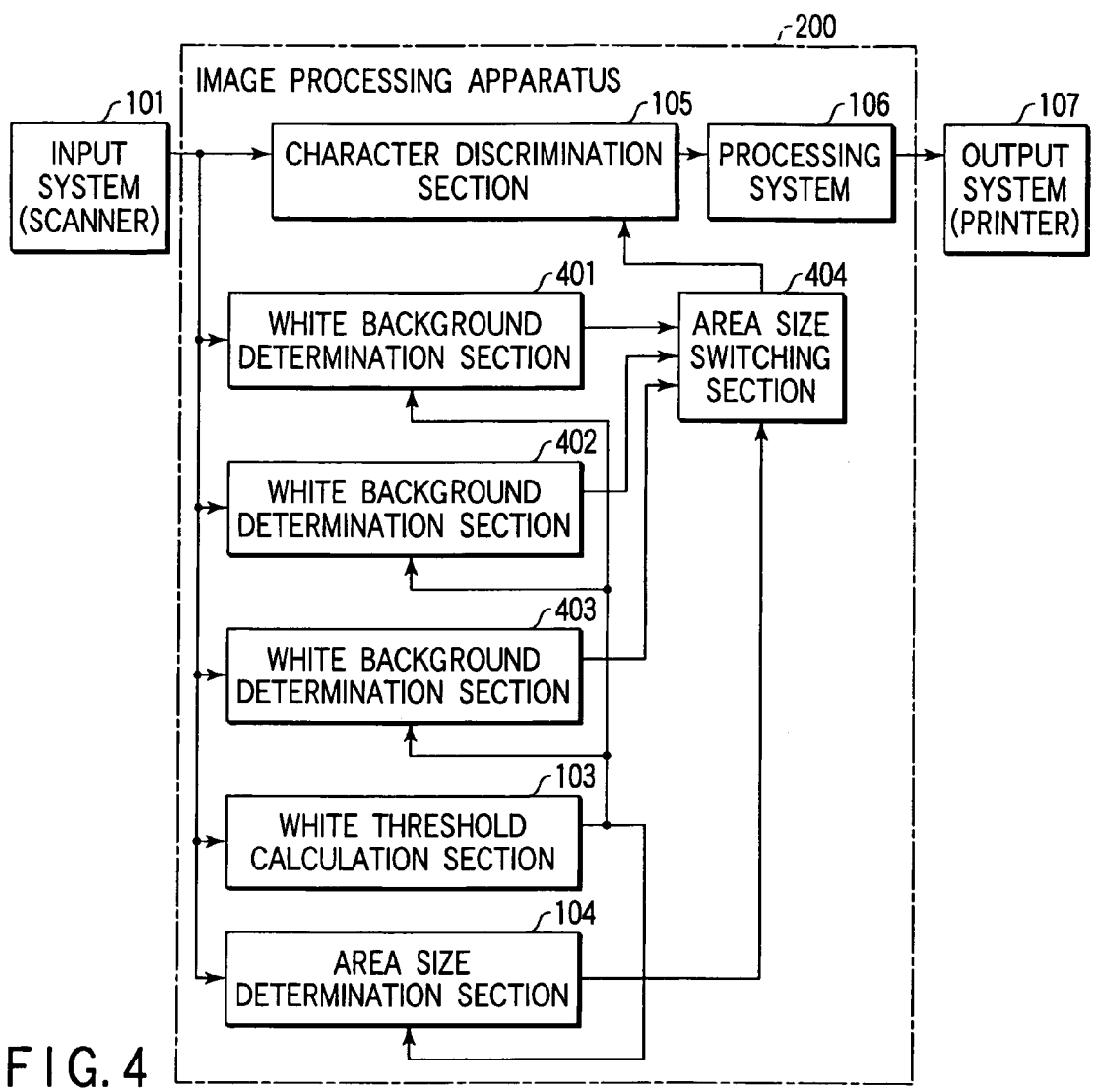
FIG. 4 is a block diagram schematically showing the structure of an image forming apparatus according to a second embodiment of the invention.

FIG. 4 schematically shows the structure of an image forming apparatus having an image processing apparatus 200 according to the second embodiment. The basic structure of this image forming apparatus is the same as that shown in FIG. 1. Common components are denoted by like reference numerals, and a description thereof is omitted. In addition, common elements in the image processing apparatus 200 according to the second embodiment and in the image processing apparatus 100 according to the first embodiment are denoted by like reference numerals, and a description thereof is omitted.

The image processing apparatus 200 of the second embodiment has a plurality of white background determination sections (401-403), and an area size switching section 404 is newly provided.

The white background determination section 401 performs white background determination, recognizing that a pixel with a value greater than a white threshold (Dw or Dwth) obtained by the white threshold calculation section 103 in a preset first area is a white pixel. For example, this process corresponds to step ST1 in FIG. 5.

The white background determination section 402 performs white background determination, recognizing that a pixel with a value greater than a white threshold (Dw or Dwth) obtained by the white threshold calculation section 103 in a preset second area is a white pixel. For example, this process corresponds to step ST2 in FIG. 5.

The white background determination section 403 performs white background determination, recognizing that a pixel with a value greater than a white threshold (Dw or Dwth) obtained by the white threshold calculation section 103 in a preset third area is a white pixel. For example, this process corresponds to step ST3 in FIG. 5.

Based on an area size (ST4) selected in the area size determination section 104, the area size switching section 404 switches the determination result obtained in the white background determination sections 401 to 403, and delivers the switched result to the character discrimination section 105 (ST5).

The operations of the character discrimination section 105 and processing system 106 have already been described above.

Figure 5:
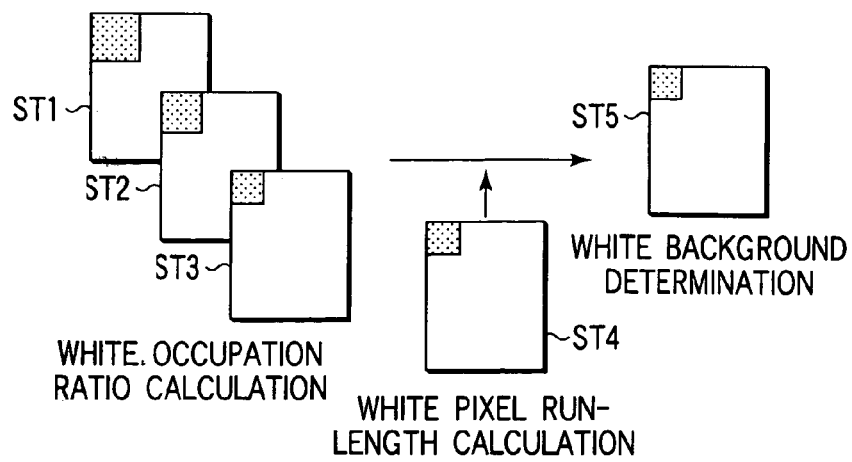
FIG. 5 is a view for explaining switching of a processing size.

As is schematically shown in FIG. 5, the white background determination results obtained with the three sizes are switched according to the result of white pixel run-length. The variation of the size, however, is not limited.

As has been described above, according to the second embodiment, the size of the operator is not changed each time determination is made. Instead, a plurality of white background determination results are prepared, and the determination results are switched according to the white pixel run-length in the vicinity of the pixel of interest. Thereby, proper white background determination for the original can be made.

In the second embodiment, compared to the first embodiment, the variation in size can be altered more easily.

A third embodiment of the invention will now be described.

The structure of the third embodiment is the same as that of the image processing apparatus 100 of the first embodiment.

In the first embodiment, the detection of the screen dot area is performed in the following manner. The sum or average of the difference value between adjacent pixels in the vicinity of the pixel of interest is compared with a threshold. If the sum or average is greater than the threshold, it is determined that the pixel of interest is highly possibly a screen dot area.

In the third embodiment, the process of the white background determination section 102 is replaced with the following process, and this process is used for switching the threshold for the white occupation ratio.

In principle, the process of finding the difference between adjacent pixels is common. However, the number of locations where the difference is greater than a certain threshold is counted. The inter-pixel count value greater than the threshold is found both in the main scan direction and sub-scan direction, and it is compared with a preset threshold value. If the count value is greater than the preset threshold value, it is determined that the pixel of interest is highly possibly a screen dot area. The difference threshold is set at different values, depending on a minimum screen dot ratio at which the presence of a screen dot area is recognized, and the threshold relating to the count value is set at different values depending on a minimum line number of a screen dot area to be detected.

As has been described above, the third embodiment can solve such a problem that an area including a resolution chart or a ruled line may erroneously be determined to be a screen dot area, leading to difficulty in detecting such an area.

A fourth embodiment of the invention will now be described.

In the preceding embodiment, the detection of a white background area has been described. In the fourth embodiment, a character to be detected is limited to an achromatic character, whereby the amount of ink used can be greatly reduced.

Figure 6:
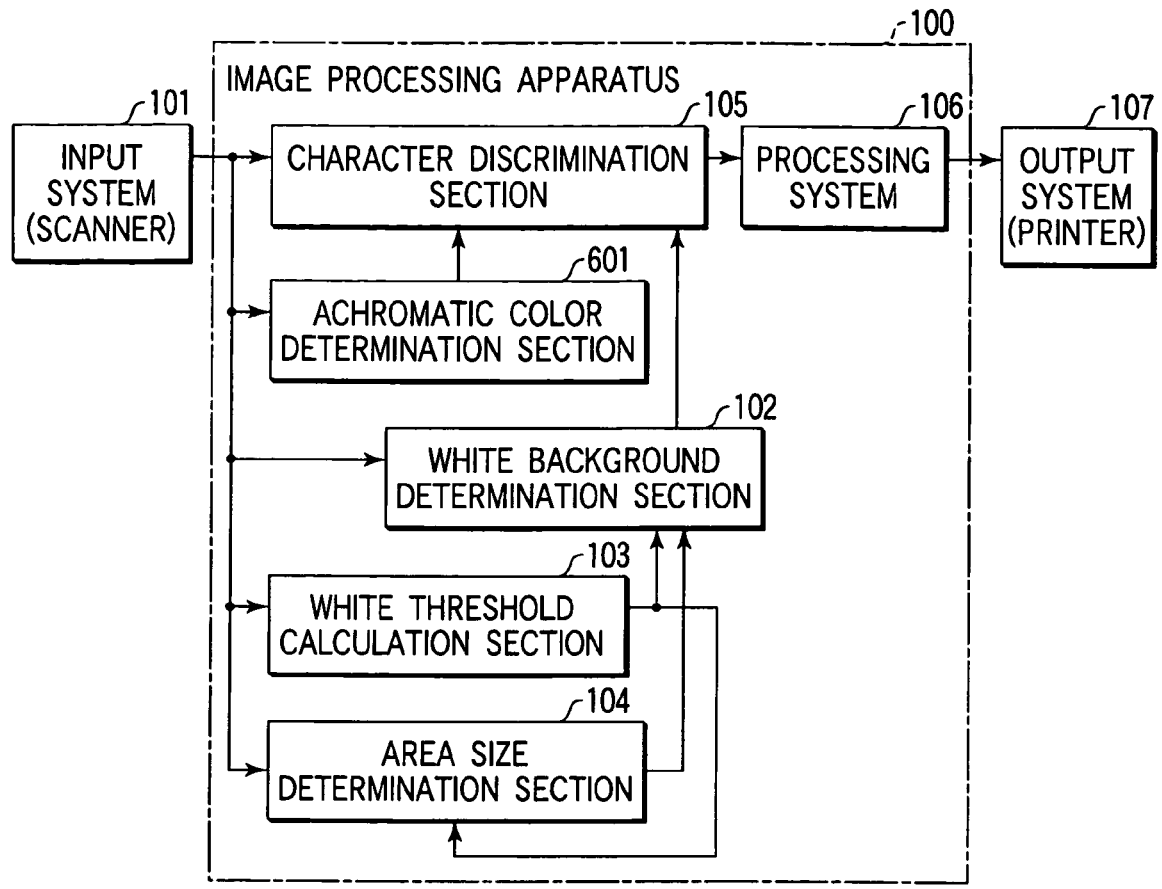
FIG. 6 is a block diagram schematically showing the structure of an image processing apparatus according to a fourth embodiment of the invention.

FIG. 6 schematically shows the structure of an image forming apparatus having an image processing apparatus 400 according to the fourth embodiment. The basic structure of the image forming apparatus is the same as that of the image forming apparatus shown in FIG. 1. Thus, the common structural components are denoted by like reference numerals and a description thereof is omitted. In addition, common elements in the image processing apparatus 400 according to the fourth embodiment and in the image processing apparatus 100 according to the first embodiment are denoted by like reference numerals, and a description thereof is omitted.

In the image processing apparatus 400 of the fourth embodiment, an achromatic color determination section 601 is newly provided.

The achromatic color determination section 601 calculates color difference equivalent values C1cen and C2cen of the pixel with the maximum luminance Dmax of the original, which is detected to find a white threshold in the preceding embodiment.

The values C1 and C2 are given by $$C1=R-G$$

$$C2=G-B.$$

The color difference equivalent values C1 and C2 of points in the area centering on C1 and C2 are found. If the values meet the following formula, it is determined that the area of interest is composed of only an achromatic character:

$$((C1-C1cen)/R1)^2+((C2-C2cen)/R2)^2 \leq 1$$

where R1 and R2 designate a major axis and a minor axis of an oval representing the achromatic area, which vary slightly doe to positional displacement of inks on the original.

Figures 7, 8:
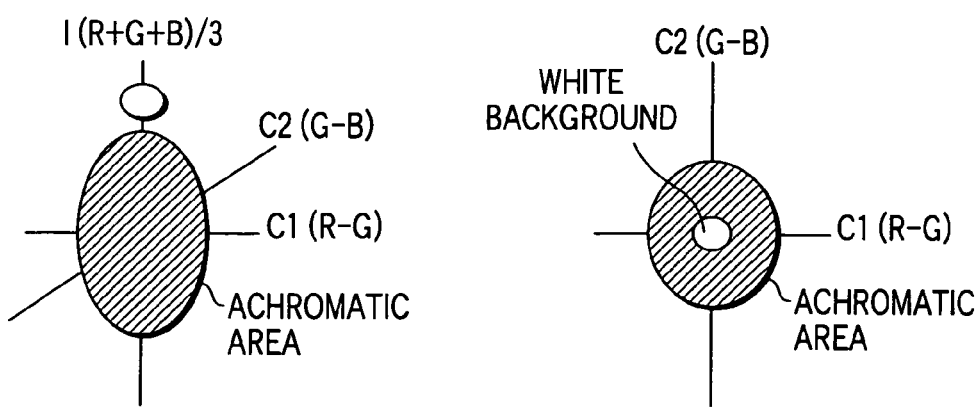
FIG. 7 is a view for explaining an achromatic color detection condition.
FIG. 8 is a view for explaining an achromatic color detection condition.

FIGS. 7 and 8 illustrate such achromatic color detection conditions.

The character discrimination section 105 executes character discrimination based on the determination result from the achromatic color determination section 601 and the white background determination result form the white background determination section 102.

The operation of the processing system 106 has already been described above.

According to the fourth embodiment, the above-described process can facilitate, e.g. processing with a single color of black.

As has been described above, according to the embodiments of the present invention, discrimination of a character on a white background, which requires legibility, is made easier than in the conventional threshold process associated with a specific attribute amount of a peripheral area of an area of interest.

It is also possible to perform area discrimination with a high degree in separation from a ruled line, and discrimination of a fine character that has been difficult to discriminate in conventional discrimination methods.

With use of this discrimination technique, a character printed on a screen dot background and a ruled line, which have been difficult to recognize in conventional discrimination methods, can be detected with high precision. The character or ruled line can be clearly output, while preventing moire in a screen dot area.

Moreover, the condition for discrimination is varied according to values corresponding to chroma and luminance of a pixel of interest. Not only a black character but also a color character, which is more difficult to discriminate, can be discriminated with high precision.

Attributes of a large area are determined in advance, and then pixel-by-pixel discrimination is carried out. Thus, discrimination with higher precision can be made than in the case of performing pixel-by-pixel discrimination under the same conditions as a whole.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a calculation section that calculates a value used to determine an attribute of an area on the basis of an image signal;
an area size determination section that determines an area size on the basis of a predetermined condition; and
an area attribute determination section that determines an attribute of a pixel of interest in the image signal, on the basis of the area size determined by the area size determination section and the value that is calculated by the calculation section and is used to determine the attribute of the area,
wherein the area attribute determination section finds, with use of a white threshold calculated by the calculation section, an occupation ratio of white pixels in an area of interest of the area size determined by the area size determination section,
wherein when the occupation ratio found by the area attribute determination section is greater than a predetermined first occupation ratio threshold, the area attribute determination section determines the pixel of interest to be a pixel in a white background area, and
wherein the area attribute determination section finds a difference value in a main scan direction and a difference value in a sub-scan direction in the area of interest of the area size determined by the area size determination section, counts a number of locations where the difference value is greater than a preset first threshold, finds the count value both in the main scan direction and sub-scan direction, compares each count value with a preset second threshold, and, when each count value is greater than the second threshold, uses a second occupation ratio threshold that is greater than the first occupation ratio threshold.

2. An image processing apparatus comprising:
a calculation section that calculates a value used to determine an attribute of an area on the basis of an image signal;
an area size determination section that determines an area size on the basis of a predetermined condition;
an area attribute determination section that determines an attribute of a pixel of interest in the image signal, on the basis of the area size determined by the area size determination section and the value that is calculated by the calculation section and is used to determine the attribute of the area; and
an achromatic color determination section that determines, based on the image signal, whether an area of interest is composed of only an achromatic character, and a character discrimination section that performs character discrimination of the pixel of interest on the basis of a determination result of the area attribute determination section and a determination result of the achromatic color determination section,
wherein the achromatic color determination section calculates color difference equivalent values C1cen and C2cen of a pixel with a maximum luminance Dmax of an original document, and determines that that the area of interest is composed of only an achromatic character when the following formula is satisfied:

$$((C1-C1cen)/R1)^2+((C2-C2cen)/R2)^2 \leq 1$$

where R1 and R2 designate a major axis and a minor axis of an oval representing an achromatic area.

* * * * *